United States Patent [19]

Shirakoshi et al.

[11] Patent Number: 4,839,730
[45] Date of Patent: Jun. 13, 1989

[54] IMAGE READING APPARATUS

[75] Inventors: Hiroshi Shirakoshi; Matahira Kotani; Masafumi Matsumoto, all of Nara; Hiroshi Morimoto, Sakurai, all of Japan

[73] Assignee: Sharp Kabushiki Kaisha, Osaka, Japan

[21] Appl. No.: 51,371

[22] Filed: May 19, 1987

[30] Foreign Application Priority Data

May 20, 1986 [JP] Japan ................. 61-117904

[51] Int. Cl.$^4$ ........................... H04H 1/024
[52] U.S. Cl. ................. 358/294; 358/213.11
[58] Field of Search ........... 358/256, 294, 285, 213.1; 250/578

[56] References Cited

U.S. PATENT DOCUMENTS 4,471,384 9/1984 Sata et al. ................. 358/294

FOREIGN PATENT DOCUMENTS 0068860 2/1986 European Pat. Off. .
0177461 4/1986 European Pat. Off. .
0183980 6/1986 European Pat. Off. .
0199454 10/1986 European Pat. Off. .
1471382 4/1977 United Kingdom .
2169467 7/1986 United Kingdom .

Primary Examiner—Edward L. Coles Sr.
Attorney, Agent, or Firm—Birch, Stewart, Kolasch & Birch

[57] ABSTRACT

An image reading apparatus in which an optical system is formed into a unit to make the entire construction compact and facilitate positioning of each component.

The optical unit comprises a block structure provided with mounts for supporting a light source base, a lens and a sensor base, respectively.

An array of light emitting elements is arranged as a light source on the light source base, and da CCD image sensor is arranged on the sensor base. An end of the lens is positioned at the document reading zone and the other end of the lens is positioned adjacent the sensor base.

5 Claims, 3 Drawing Sheets

IMAGE READING APPARATUS

BACKGROUND OF THE INVENTION

1. Field of the Invention

The present invention relates to an image reading apparatus applicable to, say, a facsimile, OCR, etc.

2. Description of Prior Art

An image reading apparatus reads information such as characters and figures on a document and converts it to an electric signal. The typical construction of a conventional image reading apparatus is shown in FIG. 1. Referring to FIG. 1, 31 is a document, 32 and 33 are transport rollers connected to a driving source for conveying the document 31, 34 is a fluorescent lamp (light source) for illuminating the document 31 when transmitted to the reading position, and 35 is a back plate facing to the fluorescent lamp 34 with the document 31 therebetween. 361, 362 and 363 are reflection mirrors which lead light reflected from the document 31 to a CCD (charge coupled device) image sensor 38 described later. 37 is a condenser lens through which the light reflected by the mirror 363 passes. 38 is a CCD image sensor which is mounted on a base 39 to receive light reflected from the document 31 and transmitted through the condenser lens 37 for conversion to an electric signal.

According to the prior art as mentioned above, the optical system (comprising the fluorescent lamp 34, the reflection mirrors 361, 362 and 363 and the condenser lens 37) is inevitably complicated in construction and large in size, resulting in a large image reading apparatus. In addition, the set of mirrors 361, 362 and 363 and the condenser lens 37 in the optical system tend to become displaced, affecting the reading performance adversely.

OBJECT OF THE INVENTION

In view of the above problems of the conventional image reading apparatus, an object of the present invention is to provide an image reading apparatus which contains a compact optical system to make the entire apparatus small.

Another object of the present invention is to provide an image reading apparatus in which an entire optical system is formed into an integral unit so as to prevent displacement of a lens system and to effect better reading performance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, an image reading apparatus of the present invention includes an optical unit comprising a light source base, a lens and a sensor base all mounted on a common optical system mounting member. An array of light emitting elements is mounted as a light source on the light source base. The lens is mounted in such a manner that an end of the lens is positioned adjacent the document surface, to be irradiated the other end being adjacent an image sensor mounted on the sensor base, thereby leading light reflected from the document to the image sensor. According to the present invention, a small image reading apparatus can be realized due to the compact unit construction of the optical system. Besides, the unit construction of the optical system makes it easy to mount the light emitting element array, the lens and the image sensor in the apparatus and prevents the displacement of these components, thus facilitating assembling operation and effecting better reading performance.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
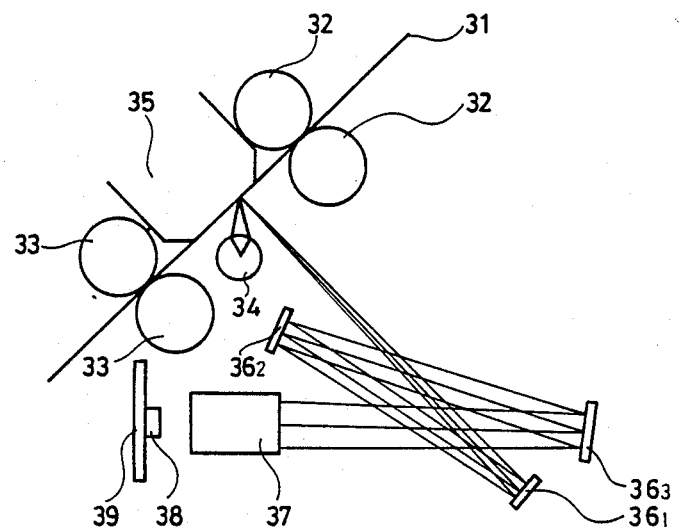
FIG. 1 is a schematic sectional view of the conventional image reading apparatus.
Figure 2:
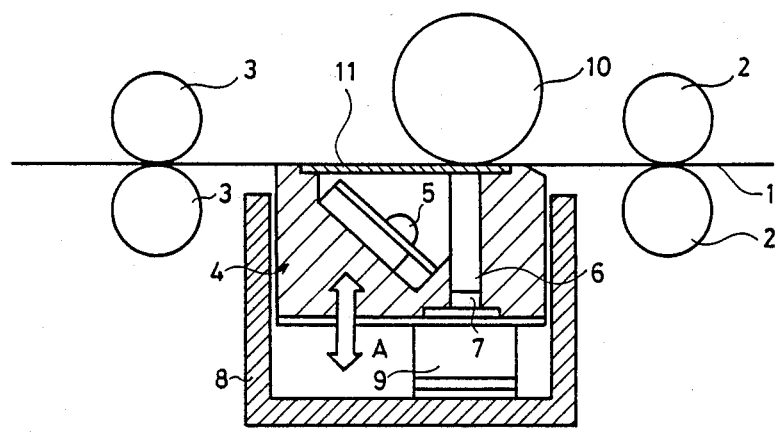
FIG. 2 is a sectional view of the reading section of the image reading apparatus of the present invention.

FIG. 2 is a sectional view of the reading section of the image reading apparatus of the present invention. 1 is a document on which information such as characters and figures is printed. 2 and 3 are transport rollers for transmitting the document 1 to the reading position. The transport rollers 2 and 3 are connected to a driving source. 4 is an optical unit mounted at the reading position between the transport rollers 2 and 3. The optical unit 4 contains a LED array 5 as a light source, a self focus lens 6 and an image sensor 7 which receives light reflected from the document 1 and led through the self focus lens 6 and converts the light to an electric signal. The optical unit 4 is housed in a unit case 8 mounted in the apparatus. The optical unit 4 is fixed to the bottom of the unit case 8 via leaf springs 9 (See FIG. 3.) provided on both ends of the optical unit 4, so that the optical unit 4 is allowed to move slightly in the vertical direction (along the arrow "A"). 10 is a back roller facing to the optical unit 4 with the document 1 therebetween. The optical unit 4 is forced toward the back roller 10 by the leaf springs 9.

Figure 3:
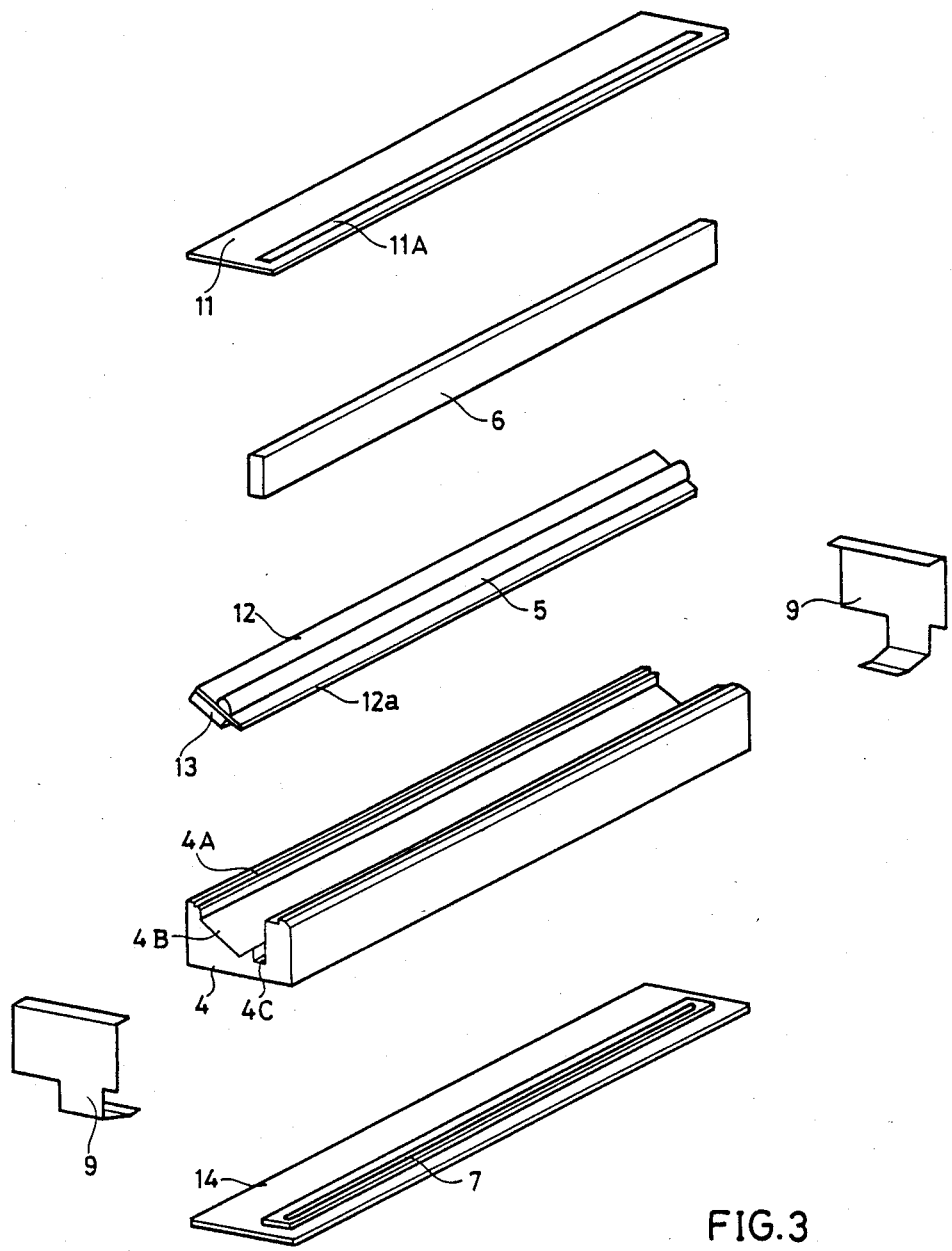
FIG. 3 is an exploded view of the optical unit of the image reading apparatus of the present invention.

The construction of the optical unit 4 is described in further detail referring to FIG. 3. The optical unit body 4 comprises a rectangular block whose length covers at least the width of the document 1. The optical unit block contains steps 4A formed in the top of the block for mounting a cover glass 11 horizontally, a groove 4B for mounting a light source base 12 on which the LED array 5 is set, and a slot 4C formed vertically through the optical unit block for mounting the self focus lens 6 lead the reflected light from the document 1 to the image sensor 7. One side 12a of the light source base 12 is linear. The LED array 5 is mounted in parallel to the linear side 12a of the light source base 12. A radiation plate 13 is mounted on the back of the base 12. The light source base 12 is inserted in the groove 4B of the unit body 4 with the LED array 5 faced upwardly. Since the groove 4B has a slant, the light source base 12 is inclined when set in the groove 4B, permitting the LED array 5 to illuminate a document obliquely from the lower side. The self focus lens 6 is of a rectangular shape and converges the light reflected from the document 1 onto the image sensor 7. The self focus lens 6 is set virtually perpendicular in the optical unit body 4 when inserted into the mounting hole 4C. The cover glass 11 is set in the upper mounting steps 4A of the optical unit body 4, protecting the LED array 5 and the self focus lens 6. A filter 11A is formed by evaporation on the surface of the cover glass 11.

The image sensor 7 comprising a CCD is mounted on a sensor base 14. The sensor base 14 is mounted on the bottom wall of the optical unit body 4, allowing the image sensor 7 to be kept in contact with an end of the self focus lens 6. Therefore, the upper end of the self focus lens 6 is made in contact with the document 1 via the cover glass 11, and the lower end in contact with the image sensor 7 on the sensor base 14.

Thus the cover glass 11, the light source base 12, the self focus lens 6 and the sensor base 14 are mounted integrally in the optical unit 4 which is fixed to the inner bottom wall of the unit case 8 by the leaf springs 9. In this embodiment of the present invention, the light source base 12 of the optical unit 4 is provided with a radiation plate 13. The radiation plate may be omitted if the optical unit itself is made of radiating material.

In the image reading apparatus of the present invention shown in FIG. 2, the document 1 to be read is transmitted by the transport rollers 2 to the reading position between the optical unit 4 and the back roller 10. Since the optical unit 4 is movable vertically due to the leaf springs 9, the document 1 is easily sent into the reading position between the optical unit 4 and the back roller 10 by the transport roller 2. Due to the compression force of the leaf springs 9, the cover glass 11 on top of the optical unit 4 depresses the document 1 against the back roller 10, making the read area of the document 1 flat. The light from the LED array 5 scans the flat surface of the document 1 optically through the cover glass 11. The light reflected from the document 1 passes through the cover glass 11 into the self focus lens 6 which condenses and leads the reflected light to the image sensor 7 made in contact with the lower end of the self focus lens 6. The image sensor 7 converts the incident light to an electric signal and outputs it. Thus, information on the document 1 is read sequentially as the document 1 is moved.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An image reading apparatus for reading information from a document, comprising:

an elongated optical system mounting member having an elongated slot, and an elongated groove inclined at a predetermined angle adjacent said slot;

a light source base and an LED light source array mounted on said base, said base and LED array being set into said elongated groove;

an elongated lens set into said elongated slot;

an image sensor base and an image sensor mounted on said image sensor base, located below said slot to contact one end of said elongated lens;

a transparent cover mounted on a top surface of said mounting member to contact another end of said elongated lens; and transport means for transporting said document over said cover to be irradiated by said LED light source array;

light reflected from said document passing through said lens and being sensed by said image sensor.

2. The image reading apparatus of claim 1, wherein said elongated mounting member includes a pair of steps in said top surface into which said transparent cover is mounted.

3. The image reading apparatus of claim 1, wherein said transparent cover is made of glass.

4. The image reading apparatus of claim 1, wherein said image sensor comprises a charge-coupled device (CCD).

5. The image reading apparatus of claim 1, further comprising a pair of leaf springs attached to said elongated mounted member;

said transport means including a roller facing said transparent cover, said document being transported between said roller and said transparent cover;

said leaf springs causing said cover to be biased against said roller to press said document against said transparent cover.

* * * * *